United States Patent [19]
Bratten

[11] Patent Number: 5,593,596
[45] Date of Patent: *Jan. 14, 1997

[54] SYSTEM AND METHOD FOR COLLECTING CUTTING FLUID LIQUID AND CHIPS

[76] Inventor: Jack R. Bratten, 5970 St. James Dr., West Bloomfield, Mich. 48322

[*] Notice: The portion of the term of this patent subsequent to Jun. 20, 2014, has been disclaimed.

[21] Appl. No.: 473,350

[22] Filed: Jun. 7, 1995

Related U.S. Application Data

[63] Continuation-in-part of Ser. No. 262,143, Jun. 20, 1994, Pat. No. 5,466,380.

[51] Int. Cl.⁶ .......................... B01D 37/00; B01D 36/00
[52] U.S. Cl. .......................... 210/741; 210/744; 210/805; 210/808; 210/104; 210/123; 210/168; 210/196; 210/418; 210/416.5; 409/137; 184/6.14; 184/103.2; 137/399; 137/563; 137/565; 137/572; 137/907
[58] Field of Search .......................... 210/86, 104, 120, 210/123, 137, 168, 194, 418, 416.5, 739, 741, 744, 805, 808, 196; 137/606, 607, 563, 565, 565.1, 572, 907, 587.5, 399; 184/6.14, 103.2; 409/137; 408/56

[56] References Cited

U.S. PATENT DOCUMENTS

| | | | |
|---|---|---|---|
| 3,897,335 | 7/1975 | Brandt | 210/167 |
| 3,954,611 | 5/1976 | Reedy | 210/168 |
| 4,139,464 | 2/1979 | Coward | 210/168 |
| 4,233,157 | 11/1980 | Miller | 210/137 |
| 4,325,663 | 4/1982 | Lee | 409/136 |
| 5,230,793 | 7/1993 | Lenhart et al. | 210/168 |
| 5,380,446 | 1/1995 | Bratten | 210/805 |
| 5,447,642 | 9/1995 | Schenach | 210/168 |
| 5,466,380 | 11/1995 | Bratten | 210/741 |

*Primary Examiner*—Robert Popovics
*Attorney, Agent, or Firm*—John R. Benefiel

[57] ABSTRACT

A system and method are disclosed for collecting cutting fluid and chips from a number of machine tools and includes a series of sumps each collecting chips and fluid at a particular machine tool, and a central sealed collection tank drawing from all of the sumps by drawpipes inserted in each sump. A single large capacity pump pumps to filtration equipment, with a predetermined vacuum level maintained in the tank by opening and closing an outlet valve between the pump and the filtration equipment. A level switch at each sump causes intermittent opening of an associated valve causing each sump to be placed in communication with the vacuum in the collection tank, and random opening of the valves causes individual sumps to be emptied by the full suction at the collection tank. The drawpipes are equipped with antivortex end shapes to allow rapid evacuation without drawing air into the system. A vacuum pump removes excess air accumulating in the collection tank.

16 Claims, 3 Drawing Sheets

SYSTEM AND METHOD FOR COLLECTING CUTTING FLUID LIQUID AND CHIPS

CROSS REFERENCE TO RELATED APPLICATION

This application is a continuation-in-part of copending United States application Ser. No. 08/262,143, filed on Jun. 20, 1994, now U.S. Pat. No. 5,466,388.

BACKGROUND OF THE INVENTION

1. Field of the Invention

This invention concerns the collection of machining cutting fluid liquid and chips from a number of machine tools to be filtered in a filtration system.

2. Description of the Prior Art

Industrial filtration equipment is often employed to filter cutting fluid liquid directed over the cutting tools during the machining process. The liquid, metal chips, and other debris generated are collected and circulated to filtration equipment for removal of the chips, with the filtered liquid returned to the system for reuse. This liquid collection has in the past been accomplished by return flow in so-called velocity trenches, which are below grade steel-lined concrete trenches equipped with jets of liquid spaced along the trench which direct the collected cutting fluid liquid, chips, and other debris along the trench and back to the filtration equipment. In a variation of this method used recently, a large volume of liquid is introduced at the beginning of the trench sufficient to carry the chips down the trench.

In recent years, below grade steel-lined trenches have become disfavored, since undetected leaks may occur through cracks in the trench, sometimes causing considerable contamination of the soil beneath the plant by the oil in the cutting fluid liquids. It is very difficult to find and repair such leaks, even if double-walled linings and leak detectors are used.

Copending U. S. application Ser. No. 08/131,298 filed on Oct. 8, 1993 by the present inventor, now U. S. Pat. No. 5,380,446, describes a vacuum collection system using in-line filter units. This approach requires pressurized filters, which are not currently in widespread use in this field. Rather, open-topped tank filters are typically employed.

Above grade piping networks have also been used, in which a pump is associated with each sump, pumping the collected liquid back to conventional filtration equipment via overhead pipes.

There are several disadvantages to this approach.

Firstly, having an industrial pump at each sump requires the wiring of each pump and starter with higher voltage lines. There are typically a large number of sumps involved with a typical installation, and thus involving substantial costs, particularly if a spare pump is specified for each sump so that the system need never be shut down for maintenance.

The extra pump at each sump increases the size of the sump, and also makes it impractical to collect liquid beneath each wing base in a transfer line as the pumps cannot be fit beneath the base.

The individual relatively small capacity pumps are not as durable as large capacity industrial pumps, creating a maintenance burden, particularly since these small capacity pumps, with their relatively tight clearances tend to become clogged with the machining chips.

U. S. Pat. No. 4,325,663 issued on Apr. 20, 1982 for an "ARRANGEMENT FOR CLEANING CUTTING FLUID," describes a vacuum collection system for sump cutting fluid only, with the chips and other heavy solids settled out and collected separately. This greatly complicates the collection and disposal of these solids, as there are numerous locations at which the chips are accumulated.

The sumps must have both cutting fluid liquid and machining chips removed and using relatively small pumps with correspondingly lower suction action has often necessitated cleanout of the sumps, creating a regular, ongoing maintenance burden.

SUMMARY OF THE INVENTION

The present invention comprises a sump system including a series of individual sumps all communicating with a central large volume sealed collection tank. A large capacity pump has its suction side connected to the central collection tank and its outlet to conventional filtration and chip handling equipment.

The individual sumps each have level controlled drawpipe valves, which upon opening allow the vacuum in the central tank to draw liquid and chips into the associated drawpipe to an overhead collection pipe, leading into the central collection tank.

The random opening of the drawpipe valves insures that at least occasionally the entire vacuum suction available at the collection tank is applied to draw liquid and solids from each individual sump, with the resulting very rapid rate of evacuation of the contents of the sump insuring a complete clearing of the sump to minimize cleanout maintenance. To allow such very powerful suction, an anti-vortex inverted cone fitting is installed on the bottom end of the drawpipe. The bottom of the sump may be hemispherically shaped to aid in collection of the chips and to retard development of vortical flow into the drawpipe.

Upon decline of the vacuum level in the collection tank to a predetermined minimum level, the pump outlet valve is reopened to pump out liquid to the filtration equipment until the predetermined vacuum level is again achieved.

A vacuum pump is also employed to draw off excess air accumulating in the central tank which excess air might be introduced into the tank with the liquid drawn in from the sumps.

The collection tank is initially filled by a flow of liquid from the clean supply header by opening of a fill valve at startup, with a vent valve also opened to allow filling the collection tank and sumps with clean liquid to a predetermined level at which a volume of air remains in the tank, after which the fill valve and vent are closed. Preferably, the fill up takes place through a connection to the overhead collection pipe at the location of the furthest downstream sump drawpipe, to speed the elimination of air from the system.

The large capacity pump is then turned on, pumping down the sealed collection tank by flow back to the filtration equipment to establish a predetermined vacuum level, and after being reached an outlet valve controlling flow to the filtration equipment is closed causing the pump to recirculate flow back into the central collection tank.

Upon system shutdown, the individual sumps and central collection tank are pumped out to the filtration equipment, preparatory to another startup cycle.

DETAILED DESCRIPTION

In the following detailed description, certain specific terminology will be employed for the sake of clarity and a particular embodiment described in accordance with the requirements of 35 USC 112, but it is to be understood that the same is not intended to be limiting inasmuch as the invention is capable of taking many forms and variations within the scope of the appended claims.

Figure 1:
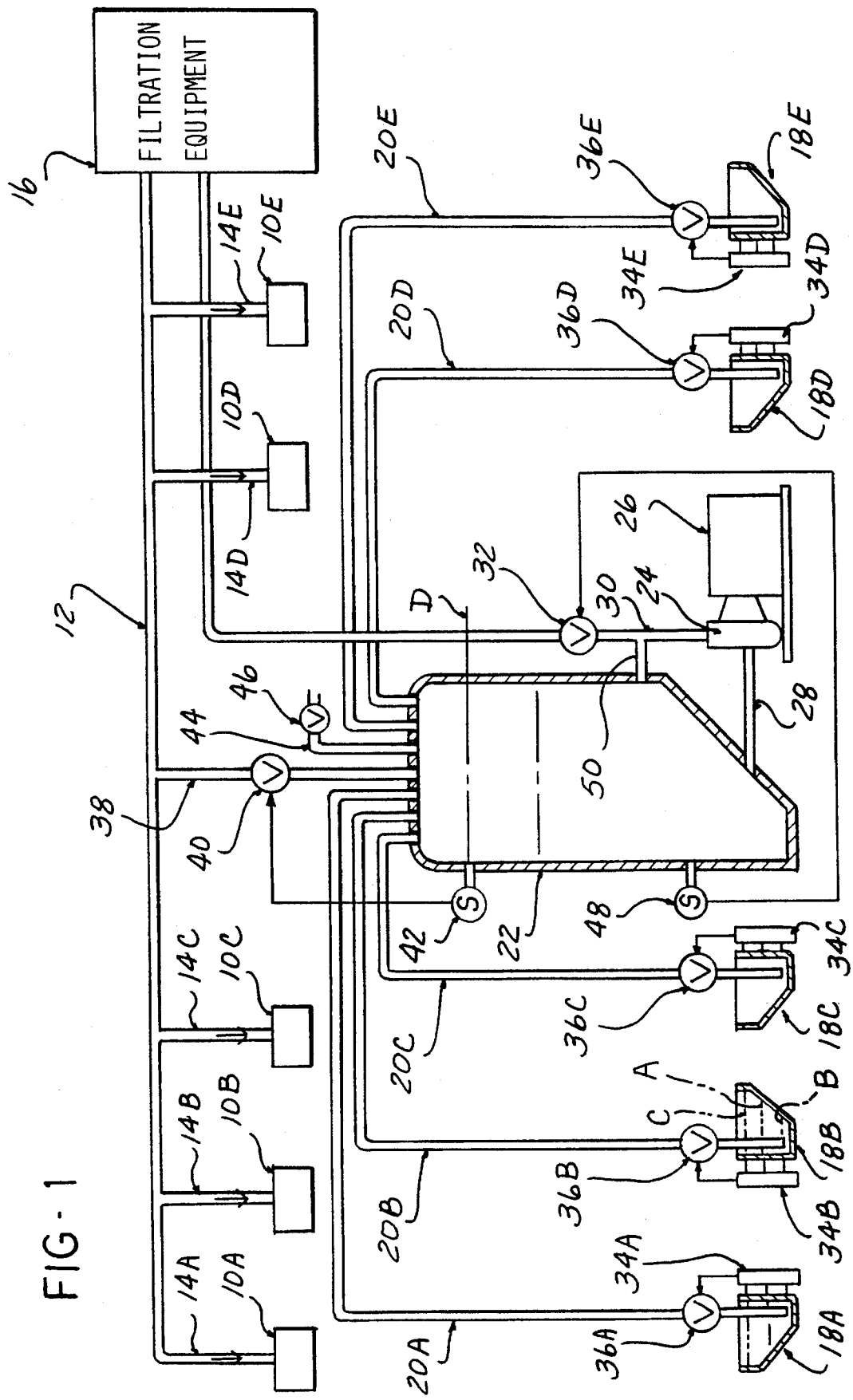
FIG. 1 is a diagrammatic representation of a cutting fluid liquid collection system according to a first embodiment of the present invention.

Referring to FIG. 1, the present invention is concerned with filtration of liquid cutting fluid supplied to a series of machine tools 10A, 10B, 10C, 10D, 10E each of which is supplied with clean filtered liquid via an overhead clean supply header 12, via a corresponding series of drops 14A–14E.

The clean liquid in the supply header 12 comes from filtration equipment system 16, which may be of any of various conventional types.

A system of individual sumps 18A–18E are provided, each located to receive and collect liquid and chips from a respective machine tool 10A–10E.

The sumps 18A–18E would typically be variously sized to collect the coolant flow from the particular associated machine tool. For example, sump 18A might be sized to receive 25 gallons per minute, sump 18B 100 gpm, sump 18C 250 gpm, sump 18D 25 gpm, and sump 18E 100 gpm.

Drawpipes 20A–20E each extend upwardly from a terminal end within an associated sump 18A–18E.

The drawpipes 20A–20E extend overhead to the top of a large sealed central collection tank 22, pipes 20A–20E passing into the tank interior, sealed to the tank top.

A large capacity industrial pump 24 driven by a multiple horsepower electric motor 26 has its intake 28 connected to the bottom of the sealed collection tank 22 and its outlet 30 connected, via a solenoid operated outlet valve 32, to the filtration equipment 16.

Each sump 18A–18E has its own level control switch 34A–34E controlling an associated outlet valve 36A so as to open the associated outlet valve 36A–36E when the level "A" is reached, and close outlet valve 36A–36E when the level "B" is reached. An emergency system shutoff can be included responsive to an imminent overflow condition at a high level "C" within each sump 18A–18E.

The central collection tank 22 is enabled to receive flow from the clean supply header 12 via drop 38 and fill valve 40.

A level control switch 42, responsive to level "D" being reached, controls opening of fill valve 40 during the startup mode only.

A vent tube 44 is also opened by opening of venting valve 46 during startup filling of the collection tank 22.

A vacuum switch 48 senses the level of vacuum in the sealed collection tank 22 and controls the operation of the pump motor 26 and outlet valve 32.

The capacity of the central collection tank 22 and pump 24 is designed to be able to handle the combined flow from all of the individual sumps 18A–18E. For the examples given, the sealed collection tank 22 would have a holding volume of 350 gallons and a transfer capacity of 500 gpm.

In operation at startup, the fill valve 40 and venting valve 46 are opened, the pump motor 26 not being energized at that time. The collection tank 22 thus is filled to level "D" at which point fill valve 40 and venting valve 46 are closed to seal the tank 22, all of the sump valves 36A–36E also being closed at this time.

The pump motor 26 is energized with the outlet valve 32 opened, drawing liquid out of the collection tank 22, which is directed to the filtration equipment 16, until a predetermined vacuum level is sensed, i.e., 15 inches of vacuum. Valve 32 is then closed, with pump flow recirculated to the tank 22 via bypass 50.

Upon the liquid in any of the individual sumps 18A–18E reaching level A, the associated valve 36A–36E opens, and the vacuum in the collection tank 22 draws liquid with chips entrained therein from sump 18A–18E.

Upon the vacuum declining to a predetermined lower level, i.e., 8 inches of vacuum, the tank outlet valve 32 is reopened to transfer liquid to the filtration equipment 16.

The system can be shut down by opening all of the sump valves 36A–36E to pump all of the liquid to the filtration equipment 16, preparatory to another startup.

The large capacity pump 26 is more reliable as the large clearances of such large capacity pumps minimize the incidence of jamming by the chips. Also, such large capacity pumps are constructed to be more durable, so that failures are rare.

The need to wire an individual pump in each sump is eliminated. This arrangement is particularly suited to transfer lines, as drawpipes 20A–20E can be routed to each station, as the small sized sumps without pumps can be disposed beneath each wing base.

The filtration equipment can be remotely located from the sumps and central collection tank, as the liquid can be pumped substantial distances, i.e., on the order of 500 feet.

The entire suction generated by the vacuum in the collection tank is at least occasionally exerted on each sump drawpipe 20A–20E to create a very powerful suction tending to completely evacuate accumulated chips and sludge. This effect is achieved since the valves 36A–36E only open when level A is reached, and only remain open long enough to draw down to level B, which will only require a short time, particularly if the other sump draw tubes are not open. Thus, the resultant short time when each of the drawpipe valves 36A–36E are open insures that all of the valves will not be opened at the same time, and periodically only a single valve will be opened to the associated drawpipe 20A–20E. This results in a powerful cleaning action for the sump as the liquid is rapidly evacuated with a flow rate, carrying the chips and sludge with the liquid.

Figure 2:
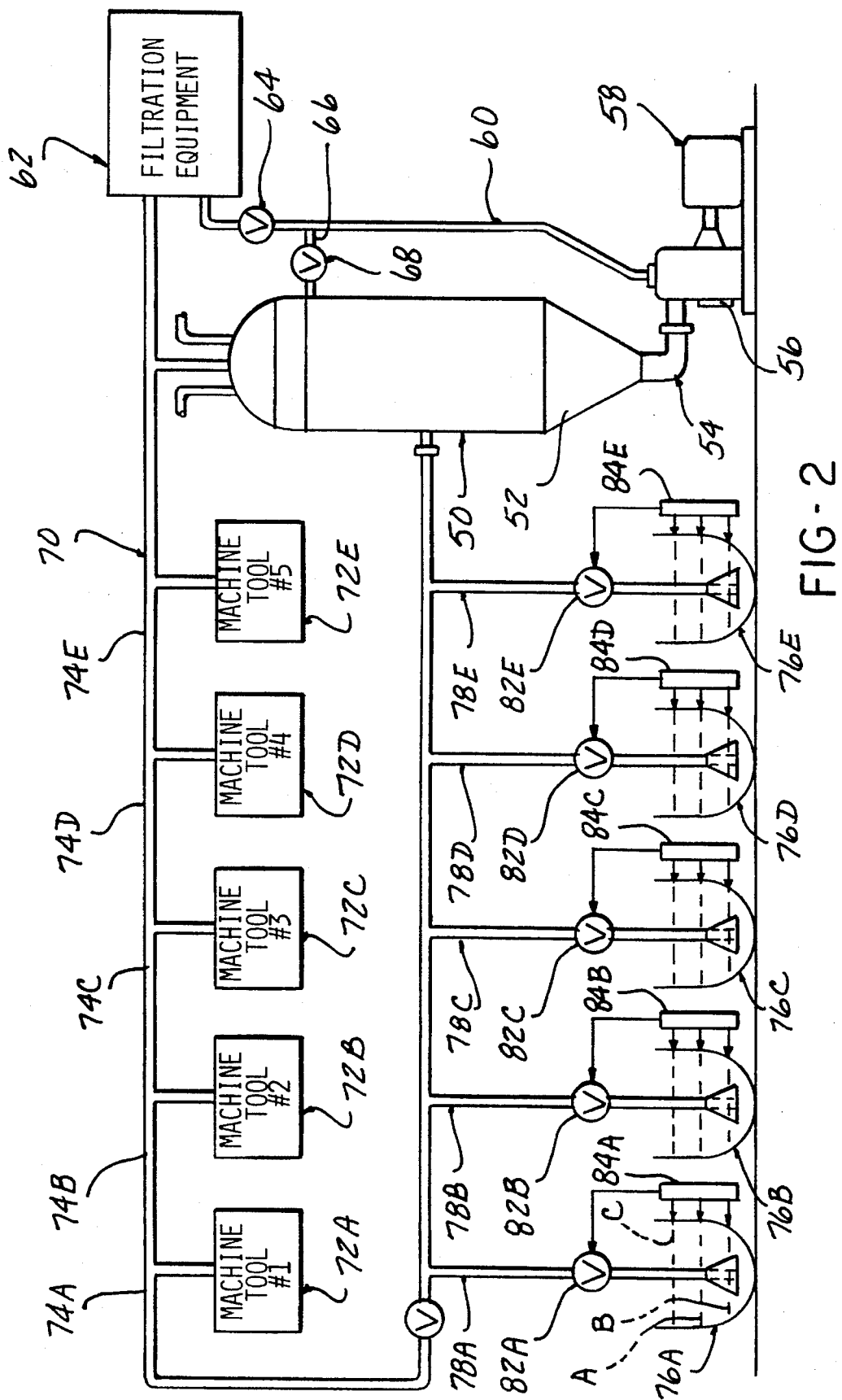
FIG. 2 is a diagrammatic representation of a cutting fluid liquid collection system according to a second preferred embodiment of the present invention.

FIG. 2 shows a preferred embodiment of the system according to the invention.

In this embodiment, a sealed main collection tank 50 is provided with an inverted conical bottom 52, with an outlet 54 at the bottom thereof to obtain a funneling effect with regard to the collected chips.

The outlet 54 is connected to the inlet of a large capacity pump 56, i.e., 320 gallons per minute capacity, driven by an industrial grade multihorse electric motor 58.

The outlet of pump 56 is connected to a return pipe 60 which directs collected liquid and chips to filtration equipment 62.

An electrically operated shutoff valve controls 64 the flow of return liquid to the filtration equipment.

A recirculation passage 64 allows recirculation back to the collection tank 50 with an optional electrically operated valve 68 allowing complete shut off of passage 64 to direct the entire flow to the filtration equipment if the system flow demands require this.

The filtration equipment 62 directs clean liquid out to an overhead header pipe 70 supplying cutting fluid liquid to a system of machine tools 72A–72E via drops 74A–74E, respectively.

A series of sumps 76A–76E are provided each located beneath a respective machine tool 72A–72E.

A vertical drawpipe 78A–78E extends downwardly into each sump 76A–76E from an overhead collection pipe 80 which extends to the collection tank 50, connected to the collection tank 50 at an intermediate level. This intermediate level connection is preferable to returning at the top of the tank as in the previous embodiment, since the head to which the liquid is drawn is recovered at the tank 50, thus conserving the available suction head.

Electrically operated valves 82A–82E control communication of each drawpipe between a respective sump 76A–76E and the collection pipe 80. The valves 82A–82E in turn are controlled by respective level switches 84A–84E, each associated with a respective sump 76A–76E.

Figure 3:
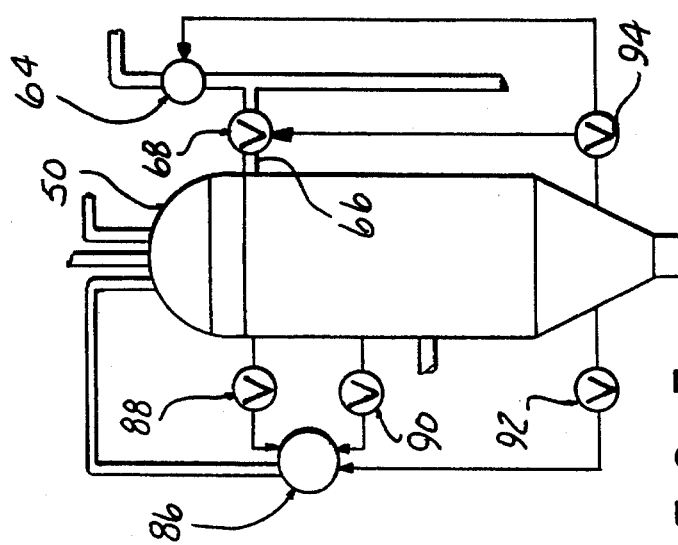
FIG. 3 is a diagrammatic representation of a portion of the controls incorporated in the system shown in FIG. 2.
Figure 6:
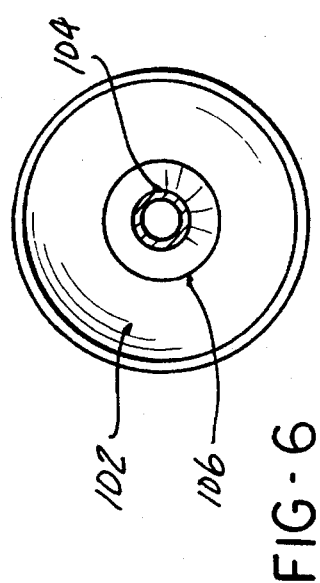
FIG. 6 is a plan sectional view of the sump and draw tube shown in FIG. 5.

Valves 82A–82E open whenever the level in the respective sump reaches a normal high level "A" and close when reaching a low level "B". An emergency shut down system (not shown) can be activated when level C is reached close to an overflow condition. As seen in FIG. 3, a vacuum pump 86 is preferably included, connected to the top of collection tank 50 so as to be able to pump out excess air. An air cushion should be left in the tank 50 at the initial filling of tank 50, so as to be able to easily maintain a vacuum therein by operation of the pump 56 and opening valve 64. However, excess air will reduce the ability to provide adequate liquid flow and vacuum levels. Air normally is entrained and also dissolved in the cutting fluid liquid, which will separate under the influence of the vacuum in the tank 50, to accumulate as excess air.

Operation of the vacuum pump 86 is controlled so as to remove this excess air while allowing the desired air cushion to remain and without creating a too high vacuum level to be reached which would adversely effect the action of the pump 56. This control of the vacuum pump operation is accomplished by a pair of level sensing switches 88 and 90 at two separate levels in the tank 50.

When liquid is at the level of the higher switch 88 which is the normal level when the predetermined maintained vacuum level exists, prior to opening the drawpipe valves 82A–82E, the vacuum pump 86 is turned off, while when the liquid falls to the level of lower switch 90, the vacuum pump 86 is turned on. A vacuum switch 92, set to be tripped when the vacuum reaches a level substantially exceeding the normally maintained vacuum level, i.e., 13 inches of vacuum, also turns on the vacuum pump 86, except when the liquid level has reached the highest switch 88.

The volume of the air cushion increases and decreases with the varying vacuum level in the tank 50, varying with inflow from the sumps so that a substantial range of the volume of the air cushion must be allowed, which is accommodated by the different liquid levels controlling operation of the vacuum pump 86.

A second vacuum switch 94 controls opening of the valve 64 (and closing of valve 68), to cause pump out of liquid from the tank 50 by pump 56. The opening of the valve 64 is set at an operating vacuum level, i.e., 12 inches of vacuum, so that as liquid is drawn into the tank 50 from the sump 76A–76E, a similar volume of liquid is pumped out through valve 64 to tend to maintain the vacuum level set.

A return flow recirculates via passage 66 unless valve 68 is used and is closed.

Figure 4:
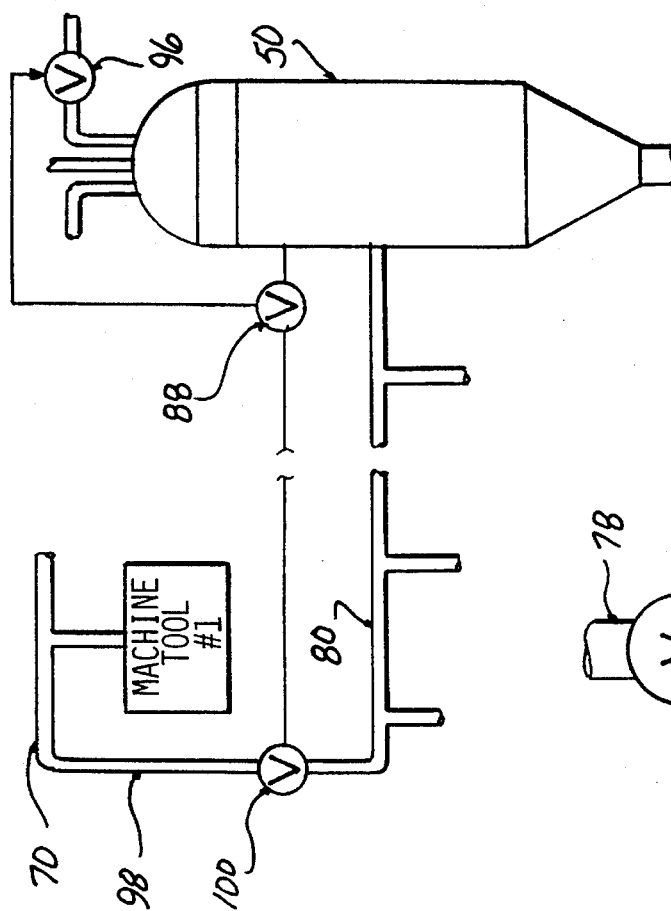
FIG. 4 is a diagrammatic representation of another portion of the controls incorporated in the system of FIG. 2.

FIG. 4 shows the controls and plumbing used for initial startup. A vent valve 96 is opened to allow clean liquid to be pumped into the tank 50. This flow is preferably introduced from the supply header 70 into the remote end of the collection header pipe 80 via a fill pipe 98 and valve 100. Level switch 88 closes valves 100 and 96 when the tank is at its maximum level. Filling in this manner speeds the elimination of air from the piping and tank 50.

The high rate of suction removal of liquid from the sumps 76A–76E by the random application of the full vacuum suction available at the tank 50 to a single sump 76A–76E is advantageous as described. However, particular features should be included in order to avoid vortices allowing the introduction of air into the system, and to assist in the removal of chips and other solids.

Figure 5:
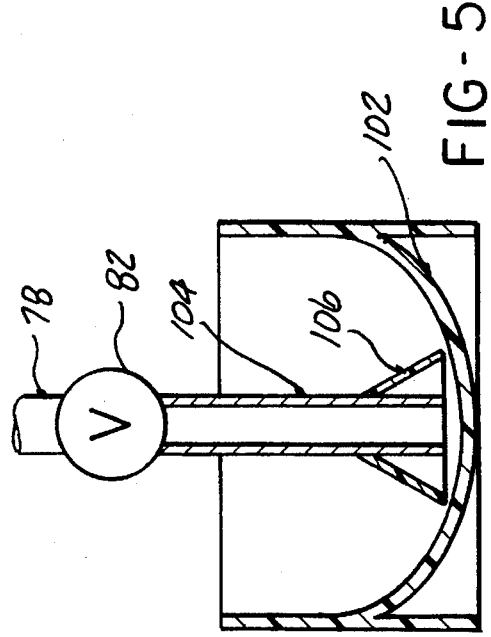
FIG. 5 is an enlarged sectional side view of a representative sump and drawpipe construction used in the system of FIG. 2.

The sumps 76A–76E preferably have partially spherical bottoms 102 (FIG. 5) to funnel solids towards a terminal end 104 of the drawpipe. An inverted cone deflector 106 is fit to the end 104 to increase the effective intake area. This effect also narrows the space between the walls of the sump and the drawpipe 78, lowering the swirl velocity to avoid formation of a vortex sufficiently deep to allow the introduction of air, despite reaching high rates of flow into the drawpipe 78.

Deflector 106 may be molded from plastic and slipped onto the end 104 of drawpipe 78.

Accordingly, the liquid and chips can be reliably and efficiently collected for central filtration and chip handling. The use of large numbers of small pumps is avoided, and the need for maintenance cleaning of the sumps is minimized.

I claim:

1. A sump system for collecting a mixture of cutting fluid liquid and chips to be filtered in filtration equipment from a plurality of machining locations, comprising:

a plurality of individual sumps, each arranged to receive a flow of cutting fluid containing chips at a respective one of said locations;

a valve in each drawpipe and level control switch means at each sump causing opening of a respective drawpipe valve upon the level of collected liquid in said sump reaching a predetermined level;

a sealed central collection tank containing a liquid;

a series of drawpipes each extending to a respective sump and having one end extending to a lower level within a respective sump and an opposite end communicating with said collection tank;

a liquid pump having an intake connected to a lower region of said collection tank and an outlet connected to said filtration system, operation of said pump generating a vacuum in said central collection tank to enable drawing said cutting fluid-liquid chip mixture from each of said sumps through said drawpipes and into said sealed collection tank;

valve means when opened directing liquid pumped from said pump outlet to said filtration equipment to generate a vacuum in said collection tank;

vacuum sensing means for sensing the vacuum in said sealed collection tank, said vacuum sensing means operating said valve means to be opened and allow pumping of said mixture out of said collection tank so as to tend to maintain said vacuum in said sealed collection tank as said mixture is drawn into said collection tank from one or more of said sumps.

2. The sump system according to claim 1 further including an outlet valve connected between said pump outlet and said filtration equipment and a bypass flow path before said outlet valve connecting said pump outlet to said collection tank, said outlet valve opened to enable pumping of sufficient mixture from said collection tank to said filtration equipment to maintain said vacuum in said collection tank.

3. The sump system according to claim 1 wherein said drawpipe valves and level switches at each sump operate so that not all of said valves are opened at the same time.

4. The sump system according to claim 1 wherein said vacuum sensing means causes said outlet valve to be opened whenever said vacuum in said sealed collection tank declines below a predetermined level.

5. The sump system according to claim 1 wherein said filtration system supplies filtered cutting fluid liquid to each of said machining locations via an overhead supply header, said drawpipes each connected to an overhead collection pipe extending from said collection tank outwardly along said sumps, further including a fluid connection and fill valve interposed between said collection pipe and said supply header at a location at an end of said collection pipe, and a tank vent means controllably opened during start-up filling of said collection tank to allow filling of said sealed collection tank to a predetermined level at startup by flow into said collection pipe.

6. The sump system according to claim 1 wherein each drawpipe has an end extending adjacent a bottom of an associated sump, said end having a divergent shape to reduce the tendency to create a vortex around said end as a strong suction is applied from said collection tank to draw liquid from said sump.

7. The sump system according to claim 1 wherein said collection tank also contains an air cushion above said liquid.

8. The sump system according to claim 7 further including a vacuum pump connected to said collection tank to enable removal of any excess air collecting in said collection tank as said cutting fluid and chips are drawn into said collection tank through said drawpipes by said vacuum maintained in said collection tank by pumping out liquid therefrom.

9. The sump system according to claim 5 wherein said collection pipe enters said collection tank at a level below said predetermined level.

10. The sump system according to claim 8 wherein a vacuum sensor switch is connected to said vacuum pump to stop operation of said vacuum pump whenever said vacuum level in said collection tank substantially exceeds said level maintained by opening of said outlet valve to said filtration equipment.

11. The sump system according to claim 10 further including a pair of level switch means, one stopping operation of said vacuum pump when liquid in said collection tank reaches a predetermined high level, and starting operation when liquid is at a lower level in said collection tank if said vacuum level does not substantially exceed said level maintained by opening of said valve to direct flow out of said collection tank.

12. A method of collecting liquid from a plurality of locations to be filtered in filtration equipment, said method comprising:

disposing an individual sump at each location so as to receive said liquid to be filtered;

providing a single sealed collection tank containing liquid and connecting all of said individual sumps with said sealed collection tank with drawpipes, each having one end extending into said sealed collection tank; and pumping liquid from said sealed collection tank out to said filtration equipment to generate a vacuum in said sealed collection tank and enable drawing liquid from each sump into said sealed collection tank and back to said filtration equipment;

opening a drawpipe valve whenever the liquid level reaches a predetermined level in a respective sump, said predetermined level above the level of said one end of each drawpipe, said valves opened so that periodically the suction generated by said vacuum in said sealed collection tank is applied to a single sump to cause a rapid drawdown of liquid therein.

13. The method according to claim 12 further including the step of initially pumping liquid from said filtration equipment into said collection tank while temporarily venting said tank, sealing said collection tank while each of said drawpipes are blocked, and then pumping liquid out of said collection tank to establish a predetermined vacuum therein, a respective drawpipe at each sump opened when liquid reaches a predetermined level therein.

14. The method to claim 13 further including the step of allowing an air cushion to remain when liquid from said filtration equipment is pumped into said collection tank to assist in maintaining said vacuum.

15. The method to claim 14 further including the step of removing any excess air accumulating in said tank during collection of liquid from said sump.

16. The method to claim 12 further including the step of widening the end of each drawpipe to reduce the degree of vortical flow occurring as liquid is drawn into each drawpipe.

\* \* \* \* \*

UNITED STATES PATENT AND TRADEMARK OFFICE
CERTIFICATE OF CORRECTION

PATENT NO.   : 5,593,596
DATED        : January 14, 1997
INVENTOR(S)  : Jack R. Bratten It is certified that error appears in the above-indentified patent and that said Letters Patent is hereby corrected as shown below:

Column 1, line 9, "U. S. Pat. No. 5,466,388" should be --U. S. Pat. No. 5,466,380--.

Signed and Sealed this

Eighteenth Day of March, 1997

Attest:

BRUCE LEHMAN

Attesting Officer

Commissioner of Patents and Trademarks